(12) United States Patent
Root et al.

(10) Patent No.: US 7,455,370 B2
(45) Date of Patent: Nov. 25, 2008

(54) BRAKE PIPE CONTROL SYSTEM WITH REMOTE RADIO CAR

(75) Inventors: Kevin B. Root, Black River, NY (US); Eric Wright, Evans Mill, NY (US)

(73) Assignee: New York Air Brake Corporation, Watertown, NY (US)

( * ) Notice: Subject to any disclaimer, the term of this patent is extended or adjusted under 35 U.S.C. 154(b) by 491 days.

(21) Appl. No.: 11/288,316

(22) Filed: Nov. 29, 2005

(65) Prior Publication Data

US 2007/0120417 A1    May 31, 2007

(51) Int. Cl.
B60T 13/74 (2006.01)
(52) U.S. Cl. .................. 303/3; 303/7; 303/15; 303/20
(58) Field of Classification Search .............. 303/7, 303/9.61, 20, 123, 3, 15, 16, 128; 701/19, 701/20
See application file for complete search history.

(56) References Cited

U.S. PATENT DOCUMENTS

| | | | |
|---|---|---|---|
| 3,380,399 A | 4/1968 | Southard et al. | |
| 4,013,323 A | 3/1977 | Burkett | |
| 4,056,286 A | 11/1977 | Burkett | |
| 4,316,640 A * | 2/1982 | Cripe ........................ | 303/20 |
| 4,344,138 A | 8/1982 | Frasier | |
| 4,487,060 A | 12/1984 | Pomeroy | |
| 4,553,723 A | 11/1985 | Nichols et al. | |
| 4,582,280 A | 4/1986 | Nichols et al. | |
| 5,374,015 A | 12/1994 | Bezos et al. | |
| 5,511,749 A | 4/1996 | Horst et al. | |
| 5,570,284 A | 10/1996 | Roselli et al. | |
| 5,681,015 A | 10/1997 | Kull | |
| 5,720,455 A * | 2/1998 | Kull et al. ............... | 246/187 C |
| 5,740,029 A | 4/1998 | Ferri et al. | |
| 5,873,638 A | 2/1999 | Bezos | |
| 6,095,618 A | 8/2000 | Heneka et al. | |
| 6,102,491 A | 8/2000 | Bezos | |
| 6,126,247 A | 10/2000 | Paul et al. | |
| 6,217,126 B1 | 4/2001 | Kull | |
| 6,227,625 B1 | 5/2001 | Gaughan | |
| 6,267,062 B1 * | 7/2001 | Hamilton, Jr. ............ | 105/26.05 |
| 6,322,025 B1 | 11/2001 | Colbert et al. | |
| 6,375,276 B1 | 4/2002 | Delaruelle | |

(Continued)

Primary Examiner—Thomas J Williams
(74) Attorney, Agent, or Firm—Barnes & Thornburg LLP

(57) ABSTRACT

A remote radio railroad car located within or at the end of the train that charges or exhausts the brake pipe in response to radio commands from the lead unit. The brake pipe control system includes a first controller at a first car at the lead end for controlling the brake pipe at the first car and transmitting, via a radio link, brake pipe control signals to a second controller in a remote car in the train. The second controller controls the brake pipe at the remote car in response to the brake pipe control signals from the first controller. If the second controller is on the last car and the last car does not include an independent end of train device, the second controller transmits brake pipe condition signals to the first controller. If the second controller is on the last car and the last car does include an independent end of train device, the first controller established separate communication links with the second controller and the end of train device. If the second controller is not on the last car and the last car includes an end of train device, the first controller established separate communication links with the second controller and the end of train device.

5 Claims, 5 Drawing Sheets

U.S. PATENT DOCUMENTS

| | | |
|---|---|---|
| 6,400,281 B1 * | 6/2002 | Darby et al. ............... 340/933 |
| 6,401,015 B1 | 6/2002 | Stewart et al. |
| 6,505,104 B2 | 1/2003 | Collins |
| 6,759,951 B2 | 7/2004 | Kellner et al. |
| 6,789,004 B2 | 9/2004 | Brousseau et al. |
| 6,824,226 B2 | 11/2004 | Smith, Jr. et al. |
| 6,839,664 B1 | 1/2005 | Kull |
| 6,854,691 B2 | 2/2005 | Kraeling et al. |
| 6,862,502 B2 | 3/2005 | Peltz et al. |
| 6,866,347 B2 * | 3/2005 | Smith et al. ............... 303/20 |

* cited by examiner

BRAKE PIPE CONTROL SYSTEM WITH REMOTE RADIO CAR

BACKGROUND AND SUMMARY OF THE INVENTION

The present system relates generally to brake control systems and more specifically to a brake pipe control system from both ends of the train and possibly at a point in between.

The control of a brake pipe of a train from ends of the train is well known as illustrated by U.S. Pat. Nos. 4,013,323 and 4,056,286. This control is produced by radio communication between the locomotive at the head-end and the caboose at the rear-end of the train. Radio control of two locomotive consists in a train with the remote consists being substantially in the middle of the train is illustrated in U.S. Pat. No. 3,380,399. The radio car receives the signals from the master locomotive and operates to create locomotive control signals for the locomotives attached to the radio car. The radio car is not itself a locomotive. Radio communication between the head and mid-train and end of train unit or a multitude of cars is illustrated in U.S. Pat. No. 6,375,276 and U.S. Pat. No. 4,553,723.

In addition, end of train units (EOT) are provided and attached to a regular car which is the last car in the train and is in radio communication with the head of train unit. There may be one-way or two-way communication. A typical example is additionally shown in U.S. Pat. No. 6,126,247.

The present disclosure is directed to a radio repeater or remote railroad car located within or at the end of the train that charges or exhausts the brake pipe in response to radio commands from the lead unit. The brake pipe control system includes a first controller at a first car at the lead end for controlling the brake pipe at the first car and transmitting, via a radio link, brake pipe control signals to a second controller in a remote car in the train. The second controller controls the brake pipe at the remote car in response to the brake pipe control signals from the first controller. If the second controller is on the last car and the last car does not include an independent end of train device, the second controller transmits brake pipe condition signals to the first controller. If the second controller is on the last car and the last car does include an independent end of train device, the first controller established separate communication links with the second controller and the end of train device. If the second controller is not on the last car and the last car includes an end of train device, the first controller established separate communication links with the second controller and the end of train device.

The remote or radio repeater car charges or exhausts the brake pipe in response to commands received from the first or head car end or unit which is generally a locomotive. It also has the capability of charging or exhausting the brake pipe as well as means for brake pipe cutoff required for brake pipe leakage testing. The radio repeater car includes a source of air pressure, a brake pipe controller and a radio module. In one embodiment the lead unit communicates with the radio repeater car in parallel to an end of train device EOT. If the radio repeater is the last car, the EOT device is mounted on the radio car. This parallel communication is secured by providing an end of car device at the lead unit. It senses the brake pipe conditions and transmits communication to the repeater car radio module.

In a second embodiment, the remote repeater radio module is capable of parallel communication to an end of car device at the lead locomotive as well as the end of train control device unit at the lead locomotive. In such case, the repeater radio module is capable of communicating with a end of train control device through a single channel.

These and other aspects of the present invention will become apparent from the following detailed description of the invention, when considered in conjunction with accompanying drawings.

DETAILED DESCRIPTION OF THE PREFERRED EMBODIMENTS

Figure 1:
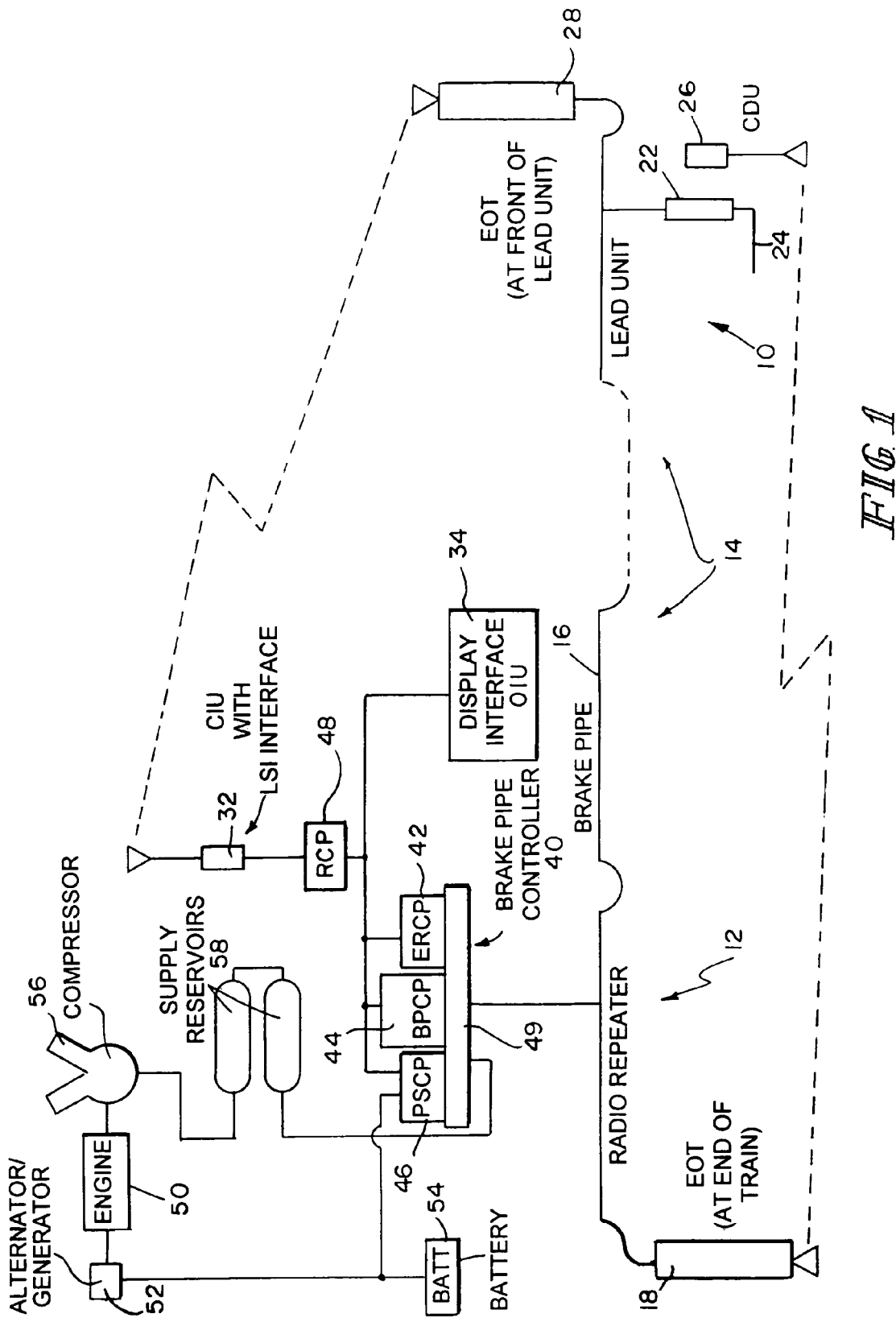
FIG. 1 is a schematic representation of a train including a first embodiment of the present brake pipe control system.
Figure 2:
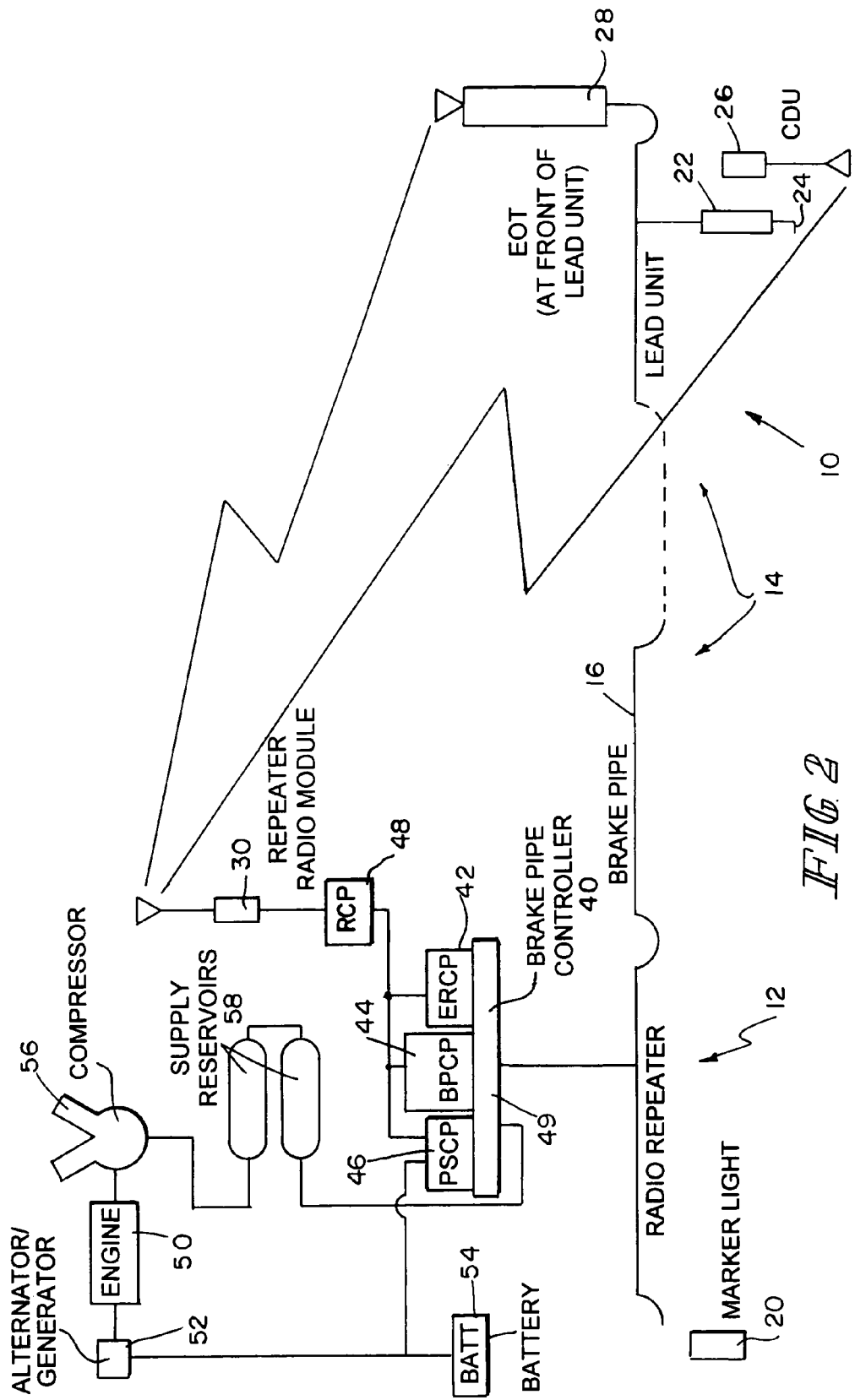
FIG. 2 is a schematic representation of a train including a second embodiment of the present brake pipe control system.
Figure 3:
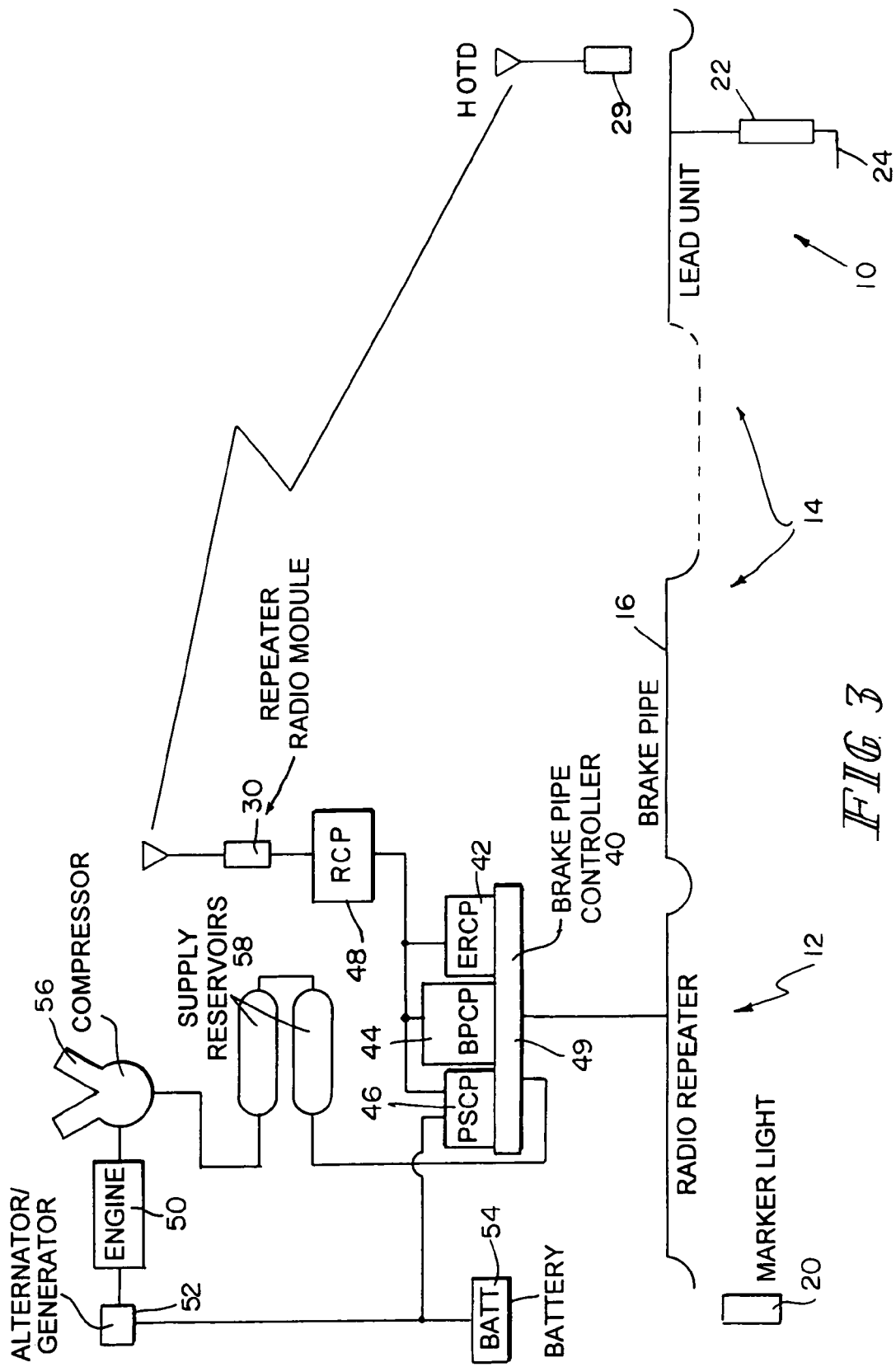
FIG. 3 is a schematic representation of a train including a third embodiment of the present brake pipe control system.

FIGS. 1-3 show a train with a head unit or locomotive 10, a remote or radio repeater car 12 and a plurality of other cars 14 therebetween and interconnected by brake pipe 16. Most of the examples to be discussed, the radio repeater car 12 is at the end of the train, but it may be anywhere within the train. Also, the lead unit is at the head end of the train and may be the first car in the train or in any case in the head end consist. In FIG. 1, the train includes an end of train device (EOT) 18 connected to the brake pipe at the last car. In FIGS. 2 and 3, the radio repeater car brake pipe control system performs the same function as the end of train device and therefore only requires a marker light 20 since it does not have the marker light that is integrated into the end of train device 18.

The lead locomotive includes a brake pipe a locomotive brake valve 22 with an input device 24 for the operator. Locomotive brake valve 22 is a brake pipe controller which controls the pressure on the brake pipe 16 to transmit brake application and release signals on the brake pipe 16. The lead unit 10 also includes a communication link for the EOT device 18. In FIG. 1, a communication device, for example a cab display unit CDU 26, communicates directly with EOT 18, whereas in FIG. 2, the CDU 26 communicates with the radio repeater module 30 since an EOT 18 is not provided. An example of a CDU is model 6696 from Union Switch and Signal.

In FIGS. 1 and 2, a separate communication link from the lead unit 10 and the EOT 18 is provided between the lead unit 10 and the radio repeater or remote car 12. This is provided by an EOT device 28 at the lead unit. In FIG. 1, the EOT device 28 at the lead unit 10 communicates with a cab interface unit CIU 32, which may be the same as the CDU 26 at the lead or just a cab interface unit CIU, for example, a Union Switch & Signal model 6680. If it is a CIU, a separate display and interface or operator interface OIU 34 is provided as illustrated in FIG. 1. If the CIU 32 is the same as the CDU 26, it has a display and operator interface integral thereto, and therefore a separate display and interface 34 is then needed. This is illustrated in FIG. 2 as the generic radio module 30.

In the embodiment of FIG. 3, the repeater radio module 30 is capable of communicating with a head of train device HOTD 29. This may be, for example, a WABTEC Train Link™ system. If such system is used, the additional EOT device 28 at the lead unit 10, as shown in FIGS. 1 and 2, would not be needed for communication to the radio repeater car 12.

It should be noted that under the present protocol, the transmitter to an end of train device can only have a single identifier for the end of train device. Thus in FIG. 1 where there are two end of train devices, two separate identifiers must be used. The CDU 26 would be set to an identifier for the EOT 18 different than the identifier that CIU 32 would bet set for the EOT device 28. In FIG. 2, the repeater radio module 30 would have the ID of an end of train device for communication with CDU 26 while the EOT 28 at the lead unit would have a different identifier for transmission with the radio module 30. In FIG. 3, bidirectional communication would be conducted with the repeater radio module 30 having an end of train device identifier to be received by the transmitter 29. The transmitter 29 would have the equivalent of a train identifier with respect to the transmitter of the repeater radio module 30.

The EOTs 18 and 28 and the remote radio car 12 acting as an EOT should be two-way communication devices with the "arming" feature for an emergency braking of the brake pipe by the EOTs.

It is obvious, the system of FIG. 1 allows remote radio car 12 to be other than at the end of train device because two separate communication links are established between the lead unit 10 and the end of train device 18 and the remote radio car 12.

Figure 4:
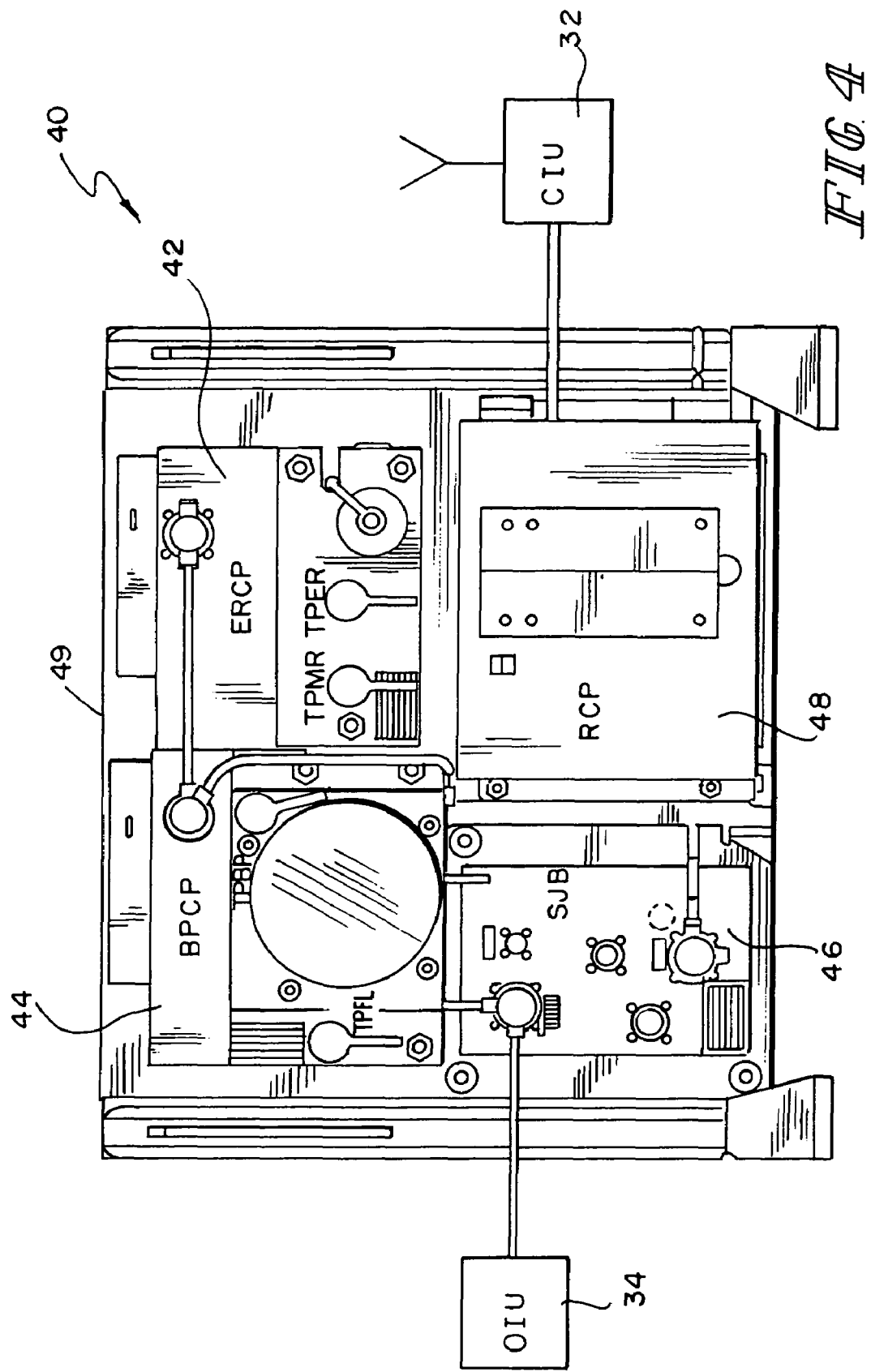
FIG. 4 is a schematic representation of a brake pipe controller in the radio repeater car according to the present brake pipe control system.

The remote radio car 12 includes a brake pipe controller 40. The brake pipe controller 40 includes an equalization reservoir control portion ERCP 42, a brake pipe control portion BPCP 44, a power supply and control portion PSCP 46 and a relay control portion RCP 48 mounted to a manifold 49. A more detailed illustration is shown in FIG. 4. The brake pipe controller 40 includes standard elements part of an electropneumatic locomotive brake system, for example CCB® Locomotive Brake Control Unit available from New York Air Brake Corporation and is illustrated in U.S. Pat. No. 6,036,284, which is incorporated herein by reference. Other electropneumatic locomotive brake systems may be used. The relay control portion RCP 48 is effectively the input device equivalent to the electronic brake valve EBV in the CCB® in that it takes the radio received brake signals and provides them as inputs to the control portions.

The remote radio car 12 also includes an engine 50, for example, diesel engine which drives an alternator/generator 52 to charge battery 54. The engine 50 also drives compressor 56 to fill supply reservoirs 58 for the brake pipe controller 40.

The brake pipe controller 40 is responsive to inputs from the display interface OIU 34 and signals received via CIU 32 or other repeater radio module 30 to control pressure in the brake pipe 16 at its car. Signals are used to vary the value in the equalization reservoir to the desired brake value by ERCP 42. The brake pipe control portion BPCP 44 is responsive to the value in the equalization reservoir to control the value of the brake pipe 16 at its car. Measured values of brake pipe and equalization reservoir may also be transmitted from the remote radio car 12 back to the head end unit via 30 or 32.

The brake pipe controller 40 is that in a CCB® controller. Reference is made to FIG. 10 of U.S. Pat. No. 6,036,284 for the details. The brake pipe control portion BPCP 44 is responsive to the pressure and equalization reservoir controlled by the equalization regular control portion ERCP 42 and controls the brake pipe as a function of the pressure and equalization reservoir and the brake pipe pressure.

Figure 5:
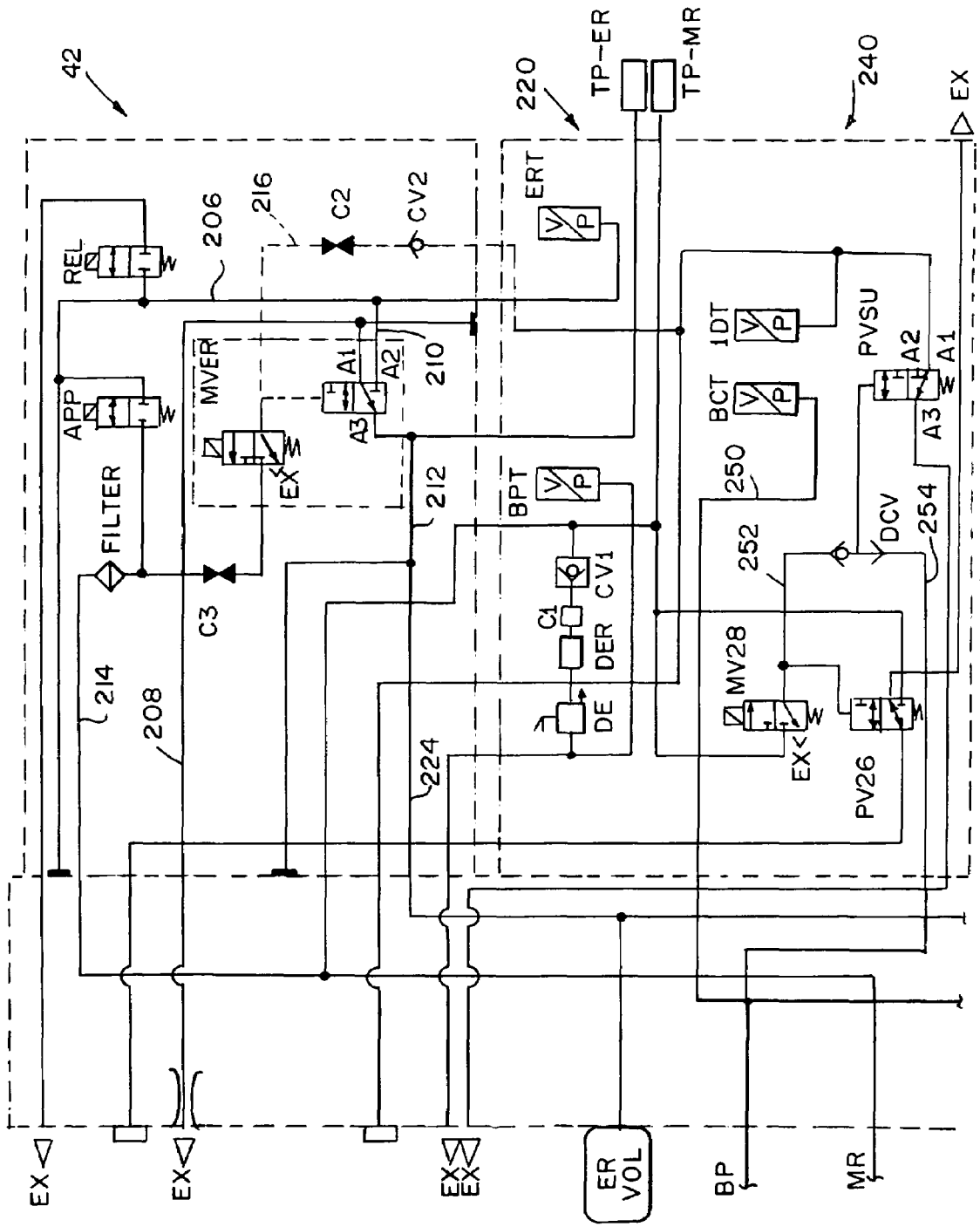
FIG. 5 is a fluid schematic representation of an equalization reservoir control portion of the FIG. 4 controller.

The equalization reservoir control portion ERCP 42 as illustrated in FIG. 5, is a modification of the equalization reservoir control portion ERCP 42 as shown in FIG. 18 of U.S. Pat. No. 6,036,284. The input 208 into the MVER is not the ER backup but is exhaust EX. The choke and check valve portion DE, DER, C1, CV1 used to interconnect the main reservoir MR and the brake pipe BP 16 is disabled by connecting the brake pipe port to exhaust EX, as is shown in portion 220.

The present structure has an addition structure for pneumatic emergency and electronic control similar to portion 240 of the 16 interface portion illustrated in FIG. 22 of U.S. Pat. No. 6,036,284. The magnetic valve portion of the MVER, which is the pilot line for the pneumatic portion, are connected via line 216, choke C2 and check valve CV2 to the output of an emergency pilot valve PVSU. Pilot line 216 for emergency pilot valve PVSU is either closed or open via line 252 exhaust EX. If it is connected to exhaust it prevents the pilot pressure for the pilot valve portion of the MVER to build up. This results in the output 212, which is connected to the equalization reservoir, to be connected to exhaust EX equalization reservoir. The pilot portion of the pilot valve PVSU is connected to the output of the double check valve DCV. One input on line 254 is connected to the main reservoir. The other input on line 252 is connected to the output of the magnetic valve MV26. MV26 is selectively controlled to connect line 252 to the main reservoir or MR to the exhaust EX. A pilot MV26 has been connected so it has no effect on the ultimate circuit.

Supply from supply reservoirs or MR 58 is connected to the brake pipe controller 40 where the manifold 49 distributes to each the ERCP 42 and the BPCP 44. Equalization reservoir (ER) pressure is developed and controlled by the 'APP & REL' magnet valves in conjunction with feedback pressure from transducer ERT. The ER control is connected through the pilot valve of magnet valve MVER to the ER Volume and thus the control port of the brake pipe relay within the BPCP 44, as previously described.

The MVER magnet valve is normally de-energized. This causes its pilot valve to be in the de-activated position as shown. In this position, the ER Volume is connected to atmosphere either preventing charging of brake pipe or exhausting ER Volume at a prescribed rate (chocked orifice normally set to service rate).

In order to electronically control ER Volume, the MVER must be energized and the pneumatic override must be satisfied. The MVER is driven directly by the intelligent controller of the ERCP 42 and is energized when the remote radio car is active and no fault or override condition is present. When the MVER is energized, MR supply is ported to the pilot valve and through check valve CV2 to the #10 port (blanked optional potential) and to pilot valve PVSU. The PVSU de-activated ports through to exhaust. The PSVU is the override that must be activated to allow pressure to build at the MVER pilot valve to connect ER Volume. The PVSU is activated when the brake pipe trainline is not in emergency (or when brake pipe is greater than ~20 psi) or when the magnet valve MV26 is energized as controlled by logic.

In the event of an emergency brake application or reduction of brake pipe to 0 psi, the design is such to de-activate pilot valve PVSU and thus exhaust the #10 port which causes the MVER pilot valve to de-activate and exhaust ER Volume to atmosphere. The MV26 is momentarily energized by logic for the recovery of an emergency.

The 10T transducer provides status of the pneumatic override to the logic controller. The BCT transducer provides a secondary brake pipe pressure logic input to that located in the BPCP. The BPT transducer, so far, is not required.

The ER pressure is controlled to that brake pipe command as received through the radio interface module or as overridden by logic.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A brake pipe control system for a train having a first and last car connected by a brake pipe, the system comprising:
    a first controller at the first car for controlling the brake pipe at the first car and communicating end of train signals, via a radio link, exclusively with a first end of train device connected to the brake pipe at the last car;
    a second end of train device connected to the brake pipe at the first car; and
    a second controller at a car remote from the first car for communicating end of train signals, via a radio link, exclusively with the second end of train device and controlling the brake pipe at the remote car in response to brake pipe condition signals from the second end of train device.

2. The system according to claim 1, wherein the first car is a locomotive and the remote car is a car including an engine driving a compressor which charges a reservoir and driving an alternator which charges a battery.

3. The system according to claim 1, wherein the second controller includes an equalization reservoir control portion, a brake pipe control portion and a relay control portion which provides control signals to the equalization reservoir control portion and the brake pipe control portion in response to the received brake pipe control signals from the first controller.

4. The system according to claim 1, wherein the second controller charges, exhausts or cuts off the brake pipe.

5. The system according to claim 1, wherein the second controller is on the last car; and the second controller is identified as the first end of train device and transmits brake pipe condition signals as the end of train signals of the first end of train device to the first controller.

* * * * *